(12) United States Patent
Salmikuukka

(10) Patent No.: US 10,371,531 B2
(45) Date of Patent: Aug. 6, 2019

(54) STRUCTURE INCLUDING A PASSAGEWAY

(71) Applicant: KONE Corporation, Helsinki (FI)

(72) Inventor: Jukka Salmikuukka, Espoo (FI)

(73) Assignee: KONE CORPORATION, Helsinki (FI)

( * ) Notice: Subject to any disclaimer, the term of this patent is extended or adjusted under 35 U.S.C. 154(b) by 188 days.

(21) Appl. No.: 15/202,147

(22) Filed: Jul. 5, 2016

(65) Prior Publication Data
US 2016/0313127 A1    Oct. 27, 2016

Related U.S. Application Data

(63) Continuation of application No. PCT/FI2014/050050, filed on Jan. 22, 2014.

(51) Int. Cl.
*G01C 21/20* (2006.01)
*B66B 1/46* (2006.01)
(Continued)

(52) U.S. Cl.
CPC .......... *G01C 21/206* (2013.01); *B66B 1/3492* (2013.01); *B66B 1/46* (2013.01);
(Continued)

(58) Field of Classification Search
None
See application file for complete search history.

(56) References Cited

U.S. PATENT DOCUMENTS

| 6,377,954 B1* | 4/2002 | Togawa | G06F 9/4492 |
| | | | 717/100 |
| 7,711,565 B1* | 5/2010 | Gazdzinski | B66B 3/00 |
| | | | 187/396 |

(Continued)

FOREIGN PATENT DOCUMENTS

| EP | 2469478 A1 | 6/2012 |
| FI | 121880 B | 5/2011 |

(Continued)

OTHER PUBLICATIONS

Supplementary European Search Report dated Sep. 19, 2017, for corresponding European Application No. 14879702.0.

*Primary Examiner* — Jason Lin
(74) *Attorney, Agent, or Firm* — Birch, Stewart, Kolasch & Birch, LLP

(57) ABSTRACT

Indoor positioning information is received for positioning a user within a structure including at least one passageway and one or more bookmarks, a bookmark including a location of the bookmark within the structure, and a function for operating the passageway, when the bookmark is activated. Location of the user is determined and compared with the locations of the bookmarks. At least one bookmark is determined to be activated and activated, on the basis of the correspondence of the user's location and the locations of the bookmarks. Current operational state and future operational state of the passageway are determined for controlling the passageway from the current operational state towards the future operational state that is determined on the basis of the activated bookmarks. The controlling is performed, when the current operational state and the future operational state are different.

15 Claims, 5 Drawing Sheets

(51) Int. Cl.
*G07C 9/00* (2006.01)
*G01S 5/02* (2010.01)
*B66B 1/34* (2006.01)
*G05B 15/02* (2006.01)

(52) U.S. Cl.
CPC .............. *G01S 5/02* (2013.01); *G05B 15/02* (2013.01); *G07C 9/00111* (2013.01)

(56) References Cited

U.S. PATENT DOCUMENTS

| | | |
|---|---|---|
| 7,847,675 B1 | 12/2010 | Thyen et al. |
| 8,684,142 B2 * | 4/2014 | Finschi .................. B66B 1/468 187/392 |
| 2007/0026802 A1 | 2/2007 | Gerstenkorn |
| 2007/0050131 A1 | 3/2007 | Masuda |
| 2008/0183337 A1 * | 7/2008 | Szabados ........... H05B 37/0254 700/296 |
| 2010/0331014 A1 | 12/2010 | Sanches et al. |
| 2012/0154115 A1 * | 6/2012 | Herrala ............... G07C 9/00111 340/5.64 |
| 2013/0001021 A1 * | 1/2013 | Stanley ................ B66B 1/2458 187/382 |
| 2016/0077532 A1 * | 3/2016 | Lagerstedt .............. H04W 4/02 700/277 |

FOREIGN PATENT DOCUMENTS

| | | | |
|---|---|---|---|
| JP | 2005-149284 A | 6/2005 | |
| JP | 2005149284 A * | 6/2005 | ......... G07C 9/00103 |
| WO | WO 01/02279 A1 | 1/2001 | |
| WO | WO 2008/048020 A1 | 4/2008 | |

\* cited by examiner

US 10,371,531 B2

STRUCTURE INCLUDING A PASSAGEWAY

CROSS REFERENCE TO RELATED APPLICATIONS

This application is a Continuation of PCT International Application No. PCT/FI2014/050050, filed on Jan. 22, 2014, which is hereby expressly incorporated by reference into the present application.

FIELD

The invention relates to positioning a user within a structure including a passageway, and particularly to operating the passageway on the basis of the positioning.

BACKGROUND

Elevators are hoisted in vertical passageways between floors. These passageways may be also referred to as hoistways due to the movement of the elevator car by hoisting operation past the floors. A hoistway is equipped with hoisting equipment, e.g. an elevator car that is hoisted under control of elevator control system. Elevator control system drives the elevator car between the floors based on the elevator calls obtained via an elevator control panel from the users. The elevator control panel is located in each floor to enable the calling of the elevator to the floor.

Accordingly, issuing an elevator call requires the user to manually operate the elevator control panel. The elevator call is issued by using the elevator control panel in the same way regardless of the user is leaving or coming back to home, visiting the building or the actual purpose the user is within the building. After all, the user is typically not in the building just for using the elevator. Accordingly, the presence of the user within a building is not appreciated in issuing the elevator calls manually.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect there is provided a method comprising receiving indoor positioning information for positioning a user within a structure including at least one passageway and one or more bookmarks, a bookmark including a location of the bookmark within the structure, and a function for operating the passageway, when the bookmark is activated, determining a location of the user, comparing the location of the user with the locations of the bookmarks, determining at least one bookmark to be activated on the basis of the correspondence of the user's location and the locations of the bookmarks, activating the determined bookmark.

According to an aspect there is provided a method for operating a passageway within a structure, the method comprising obtaining one or more bookmarks, a bookmark including a location of the bookmark within the structure, and a function for operating the passageway, when the bookmark is activated, determining an activation of a bookmark, determining a current operational state of the passageway, determining a future operational state of the passageway on the basis of the function of the activated bookmark, controlling the passageway towards the future operational state, when the current operational state and the future operational state are different.

According to an aspect there is provided an apparatus comprising means to perform a method according to a method according to an aspect.

A computer program product comprising executable code that when executed, cause execution of functions of a method according to an aspect.

According to an aspect there is provided a computer program embodied on a non-transitory computer readable storage medium, the computer program being configured to control a processor to perform a method according to an aspect.

According to an aspect there is provided a computer program embodied on a distribution medium, comprising program instructions which, when loaded into an electronic apparatus, constitute the functionality of an apparatus according to an aspect.

Some aspects provide improvements comprising operating a passageway in a structure by indoor positioning information for positioning a user in the structure.

Some aspects provide improvements comprising flexible controlling of the passageway from one operational state to another by bookmarks.

Some aspects provide improvements comprising operating a passageway by a virtual environment.

Some aspects provide improvements comprising pre-scheduling of passageway operations.

BRIEF DESCRIPTION OF THE DRAWINGS

In the following the invention will be described in greater detail by means of preferred embodiments with reference to the accompanying drawings, in which.

DETAILED DESCRIPTION

Buildings typically include passageways for transportation of people and goods. Passageways typically extend in one floor of a building, but also between levels by the passageways being inclined or the passageways including stairs. Passageways may be equipped with lighting, heating and acclimatisation systems. These systems assist transportation of traffic through the passageway. In the following they are referred to as transportation systems. The transportation systems may be controlled manually but increasingly also by building automation systems.

Figure 1:
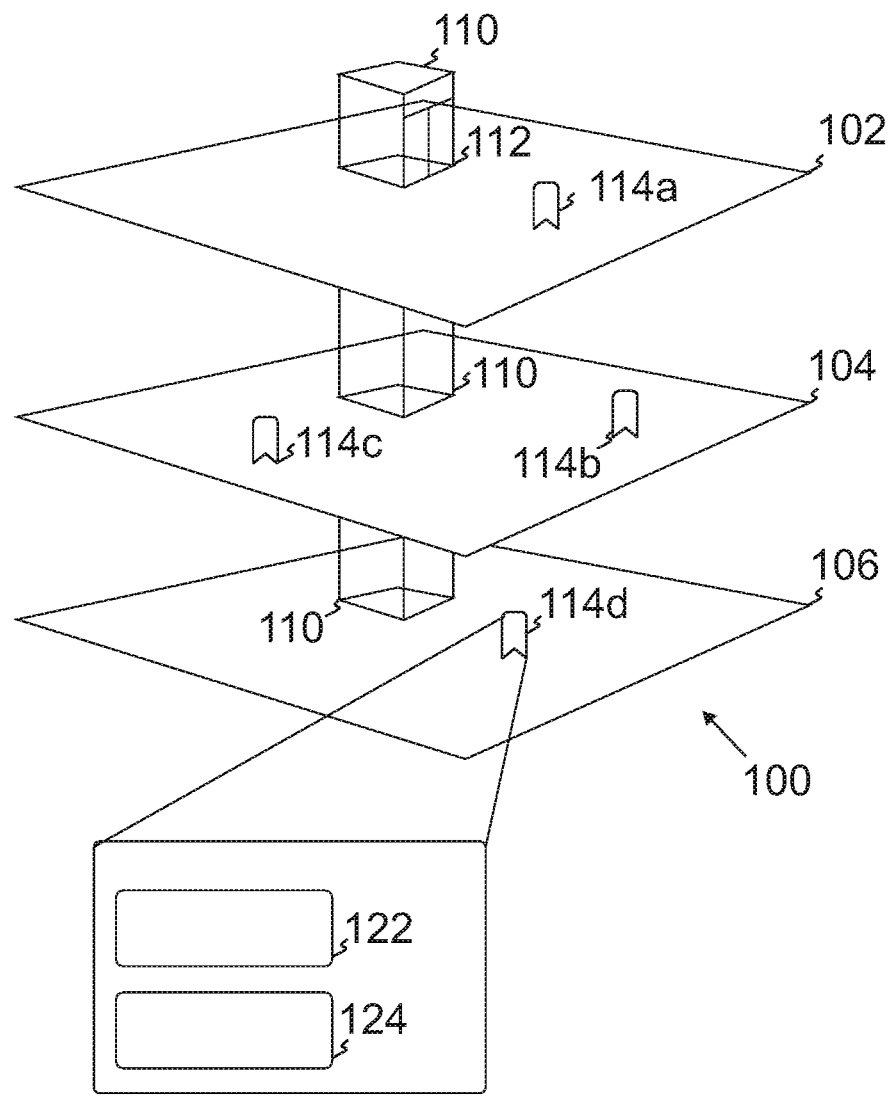
FIG. 1 illustrates a passageway and bookmarks in a structure, according to an embodiment.

FIG. 1 illustrates a passageway 110 and bookmarks 114a-114d in a structure 100, according to an embodiment. The passage may include one or more doorways 112 to passage zones 102, 104, 106. The doorways provide traffic to move between the passageway and the passage zones. The doorways may include doors such that the doorway may be closed, whereby the movement of the traffic between the passage zone and the passageway may be controlled and even prevented.

The structure may be any built object that is capable of housing a passageway for transportation of the traffic. A building having a plurality of floors that serve as landing zones for an elevator car is one example of the building according to an embodiment. The traffic may comprise people and/or goods.

It should be appreciated that a structure may be mobile or fixed to a geographical location. Examples of moving structure include ships and airplanes. A structure fixed to a geographical location is for example a building including apartments and/or offices.

In an embodiment the passageway may be a hoistway of an elevator. An elevator car is arranged in the hoistway for moving traffic between passage zones, referred to as landing zones for the elevator. A structure may include one or more hoistways. An elevator shaft is formed by the structure including the elevator. The elevator shaft may include more than one hoistways, in parallel or arranged on top of each other in the hoisting direction of the elevator cars. A typical hoisting direction is the vertical direction, but also directions that are inclined from the vertical direction are possible. It is also possible to have more than one elevator shaft in a structure.

A bookmark may include a location 122 of the bookmark within the structure, and a function 124 for operating the passageway. The location information may comprise an indoor location of the bookmark in the structure.

In an embodiment, the bookmark may be arranged to the structure as a part of indoor positioning information of the structure. The structure may be defined by one or more locations in the positioning information. The definition of the structure may be a map including indoor locations in the structure, whereby the bookmark may be located in the building on the map.

The bookmark may be implemented as a data structure. A plurality of bookmarks may form a database.

Various indoor positioning techniques may be used to define an indoor location in the embodiments. A location of a person or object, e.g. a bookmark, within the building may be defined by a tag carried by the person or object. The location of the tag may be measured by Wireless Local Area Network, e.g. IEEE 802.11 compliant WLAN, Access Points that communicate with the tag using WLAN radio signals. In another example the tag may be a Radio Frequency Identifier (RFID) transponder and the building may have RFID scanners that obtain a response signal from the tag, when the tag is near the RFID scanner. In this way the tag may be positioned at least with the accuracy of the RFID scanner. Locations within a building may be defined on a map formed by magnetic field mapping. In magnetic field mapping the magnetic field inside the building may be measured in different locations and a map may be formed on the basis of the measured magnetic field information.

In an embodiment a bookmark, the bookmark may be arranged to the structure as a physical unit installed as a part of the structure. The physical unit may be installed to a fixed location inside the building and be arranged to be activated on the basis of the correspondence of the user's location. Additionally or alternatively a location of transported goods may be used to activate the bookmark. Also further criteria may be for determining activation of the bookmark than the location information.

Figure 2:
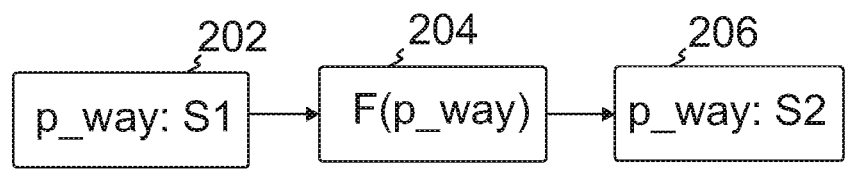
FIG. 2 illustrates a function operating a passageway from one operational state to another.

FIG. 2 illustrates a function 204 operating a passageway from one operational state S1 202 to another S2 206. The operational state of the passageway indicates a current capability of the passageway to transport traffic within the structure. The capability may be defined by the properties of the passageway and/or by the properties of the structure. An examples of the properties of the passageway comprise lights on or off in the passageway. One example of the properties of the structure defining the capability is the number of passage zones and/or an operational state of the building automation system.

In one example the state S1, S2 may indicate whether the passageway is open for transportation of traffic or not. Passageways having only a very few states, e.g. the S1 "open" and S2 "closed" are suitable for relatively simple passageways, e.g. passageways having only one doorway, or one route extending between doorways. The function operating the passageway causes the passageway to change from its current state S1 to another state S2.

More complex passageways may have more states. These passageways may have several routes and/or doorways which traffic entering the passageway can take. In one example of a complex passageway is a hoistway of elevator, where the elevator has a plurality of landing zones. The landing zones may represent states of the elevator. There may be further states for indicating direction of the elevator. Already an elevator with two landing zones may have more than one state, since elevator state may indicate, whether the elevator is travelling from one landing zone to another, stopped to one landing zone or stopped to another landing zone. Further states may be needed if the direction of the elevator during its travelling should be is indicated, whereby separate states for each direction could be used. Similarly, to the example of simple passageways having only two states, the function may operate the more complex passageway to change the current state of the passageway to some of the other states of the plurality of states.

In an embodiment a function comprises one or more of: moving an elevator car between landing zones, switching lights on/off in the passageway, heating or cooling of the structure to a set temperature, navigating to a location within the structure, operating a building automation system and transmission of an automated message to a predetermined recipient. Correspondingly, operational states comprise a landing zone, lights on/off in the passageway, temperature of the structure, a location within the structure, an operational state of a building automation system, and transmission state of an automated message to a predetermined recipient.

In an embodiment the passageway may comprise a transportation system that assists traffic to be transported through the passageway. The function may operate the transportation system via an interface that may be implemented by a combination of software and hardware. Pre-existing interfaces may be re-used and operated by drivers for establishing wired or wireless communications between the transportation system and the function of the bookmark.

The transportation system may comprise hoisting machinery, an elevator control system, one or more lights, heating device, cooling device, navigation system, a building automation system and a message transmission system. Hoisting machinery is preferable for hoisting an elevator car in a hoistway between landing zones. An elevator control system is preferable for controlling hoisting machinery and/or controlling the driving of the elevator between landing zones by a function of the activated bookmark, elevator calls to landing zones, daily traffic pattern of the elevator and/or a current traffic on board the elevator car. Lights may be preferably switched on and off or dimmed to adjust the lighting on the basis of the activated bookmark. The heating device, e.g. a radiator, and the cooling device, e.g. a fan, may be preferable to adjust the temperature in the passageway on the basis of the activated bookmark. The temperature may be adjusted to a set temperature. A navigation system is preferable, to guide a person in the passageway. The guiding may comprise guiding the person through a network of passageways and/or to leave the passageway through the correct doorway. The navigation may be implemented by a combination of indoor positioning of the person and e.g. lights that may be illuminated for navigating through the passageway. In a crossroads in the passageway, the lights may be illuminated in the portion of the passageway, towards the destination of the person. Also other traffic may be navigated through the passageway than people. A building automation system is preferable for controlling a combination of heating, cooling, lights, locks in a building on the basis of the activation of the bookmark. A message transmission system is preferable for transmitting an automated message to a predetermined recipient.

Figure 3:
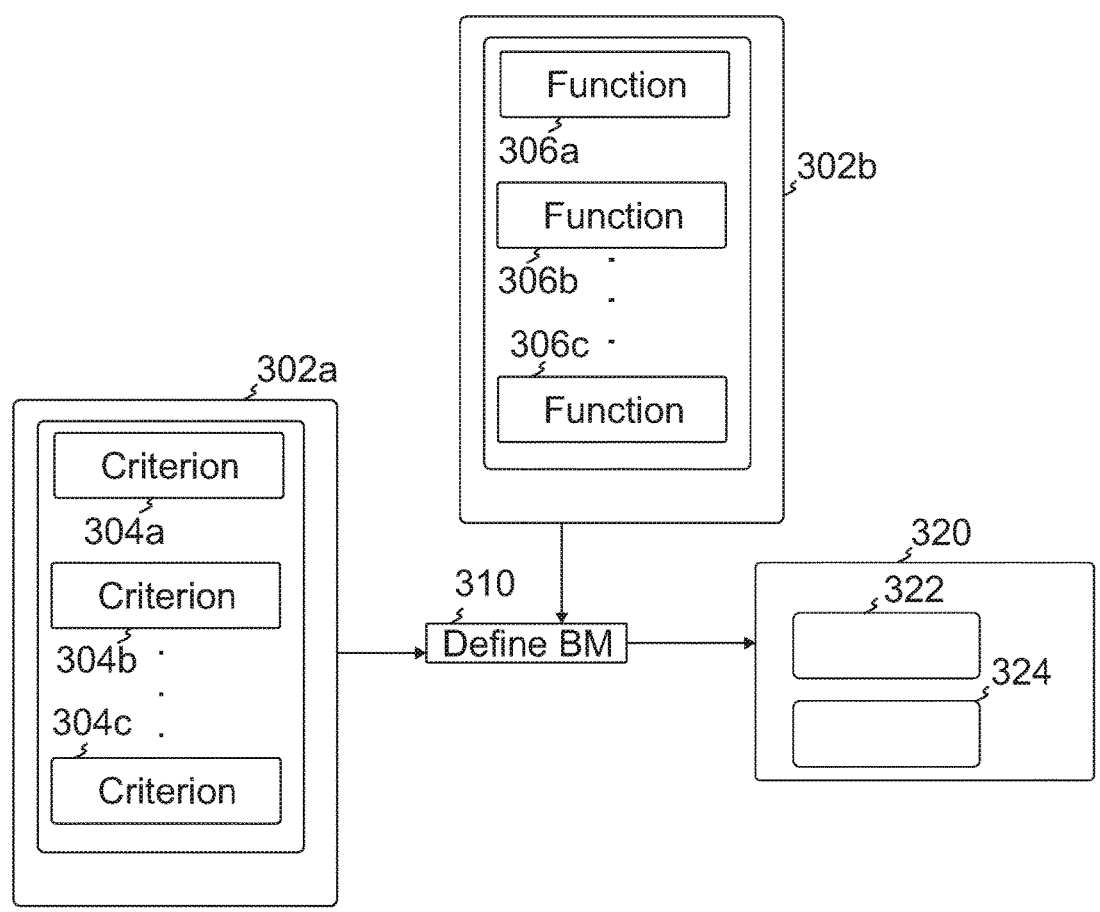
FIG. 3 illustrates defining a bookmark by user input received via a user interface according to an embodiment.

FIG. 3 illustrates defining 310 a bookmark 320 by user input received via a user interface according to an embodiment. The defining of the bookmark is illustrated by functional blocks that may be implemented by an apparatus according to an embodiment. The user interface may be provided on a display of a mobile phone. Suitable mobile phones are many present day mobile phones that have a touch screen and capability to communicate by various radio communications technologies, including e.g. Global System for Mobile Communications (GSM), 3$^{rd}$ Generation Mobile Telecommunication, Long Term Evolution (LTE), LTE-Advanced and IEEE 802.11 based Wireless Local Area Network. The user may enter one or more commands via the user interface to make selections on one or more criteria and/or function for the bookmark. Criteria and functions may be displayed as graphical elements 304a-304c, 306a-306b on the display of the mobile phone for selection of the user. The selectable criteria and functions may be displayed by views 302a, 302b on the display of the mobile phone. The selected criteria 322 and functions 324 are formed 310 into a bookmark.

The criteria defined for the bookmark cause activation of the bookmark, when the criteria are met. The activation criteria selectable by a user comprise for example one or more from a location within the structure, an activation time, a time period of activity, a user identifier of allowed users of the bookmark, a number of activation times.

Figure 4:
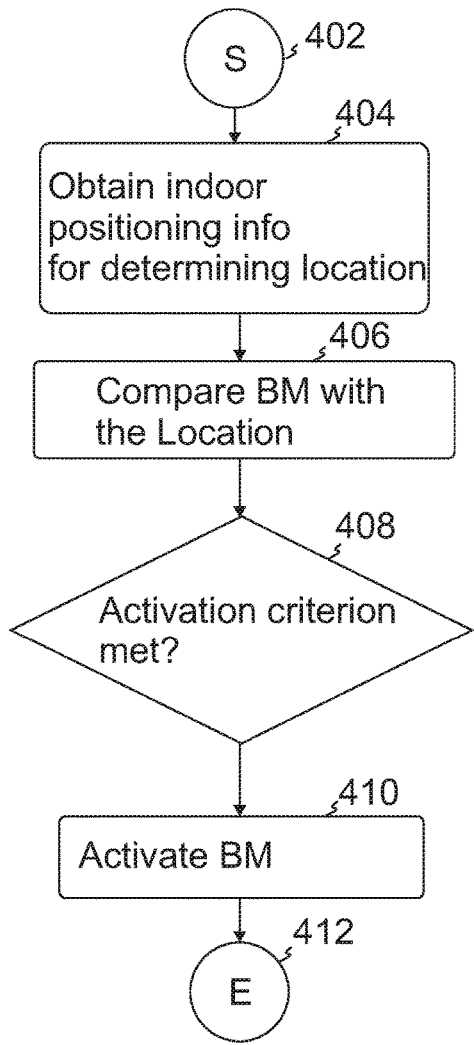
FIG. 4 illustrates a process for activating a bookmark according to an embodiment.

FIG. 4 illustrates a process for activating a bookmark according to an embodiment. The bookmark may be arranged to a structure according to FIG. 1. The process may start 402, when a user is being positioned and at least one bookmark has been defined.

In 404, indoor positioning information is obtained for positioning a user within a structure including at least one passageway and one or more bookmarks, a bookmark including a location of the bookmark within the structure, and a function for operating the passageway, when the bookmark is activated.

In 406 a location of the user is determined. The location may be determined as a location within the structure. The location of the user may correspond to a location of the device participating in the indoor positioning. The device may be a mobile phone of the user or a tag, for example.

In 408, the location of the user is compared with the locations of the bookmarks.

In 410 at least one bookmark is determined to be activated on the basis of the correspondence of the user's location and the locations of the bookmarks. It should be appreciated that if at least one bookmark is defined to a location in the building the bookmark will eventually be activated.

In 412, the determined bookmark is activated. The activation of the bookmark causes the function of the bookmark to be executed. If the bookmark has more than one function, they all may be activated. Different functions may have different activation criteria, whereby only a part of the functions may be executed by the activation.

Figure 5:
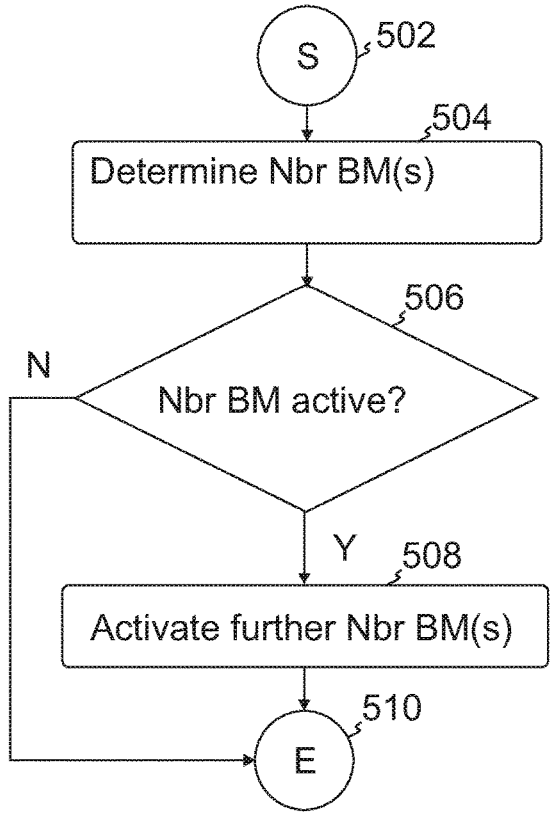
FIG. 5 illustrates a process for activating interrelated bookmarks according to an embodiment.

FIG. 5 illustrates a process for activating interrelated bookmarks according to an embodiment. A bookmark may be interrelated to one or more other bookmarks. The relation may be defined by the functions and/or by the locations of the interrelated bookmarks. The bookmarks may be defined according to the process described in FIG. 3. The method may start 502, when wherein a plurality interrelated bookmarks are defined in a structure, e.g. the structure of FIG. 1. The defined bookmarks may be activated on the basis of activation criteria as described in FIG. 4.

In 504, interrelated bookmarks may be determined. The determining may be performed, when a bookmark is activated or when a bookmark is defined. When the bookmarks ide defined, the bookmark may be stored information indicating one or more interrelated bookmarks.

If in 506 a bookmark that is activated is a bookmark interrelated to one or more other bookmarks, the process proceeds to 508. The decision in 506 may be preceded by determining whether the activated bookmark is an interrelated bookmark. The determining may be performed by checking the activated bookmark for information of interrelated bookmarks and/or by comparing the location of the activated bookmark to locations of one or more bookmarks to determine the interrelated bookmarks.

In 508 one or more bookmarks that are interrelated to the activated bookmarks are activated. In this way functions of the interrelated bookmarks may be executed by activation of the first bookmarks of the interrelated bookmarks. In 510 the process ends after interrelated bookmarks are activated.

If in 506 a bookmark that is activated is not interrelated to further bookmarks, further bookmarks are not activated on the basis of the first activated bookmark and the process ends 510.

Figure 6:
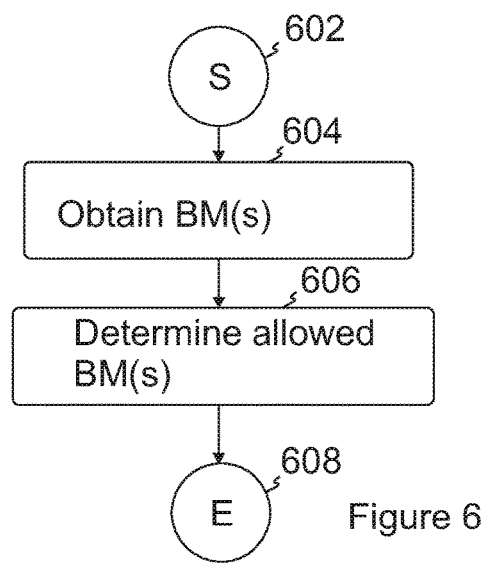
FIG. 6 illustrates a process for activating a bookmark including a criterion for activation, according to an embodiment.

FIG. 6 illustrates a process for activating a bookmark including a criterion for activation, according to an embodiment. The bookmark may be defined according to the process described in FIG. 3. The bookmark may be located in a structure according to FIG. 1. In 602, the process may start, when the bookmarks is defined to the structure.

In 604, information identifying the bookmarks within the structure may be obtained. The obtained information may be used to determine the bookmarks within the structure. After bookmarks are identified, the identified bookmarks may be derived location information and information on the function operating on a passageway in the structure. A bookmark may be defined be further criterion in addition to the location information and these criterion may be stored to bookmark.

In 606, the information identifying the bookmarks is used to identify the bookmarks in the structure and the activation criteria of the identified bookmarks is used to determine those bookmarks from the identified bookmarks that may be activated. At least one of the activation criteria may be used to determine a set of bookmarks from the identified bookmarks that may be activated. In an embodiment a user identifier of a user within the structure is used to determine the set of bookmarks that are allowed to be activated.

The user identifier may be obtained by an authentication to a service that provides the bookmarks and/or the passageway in the structure. It is conceivable that an authentication to various internet services, e.g. Facebook, LinkedIn may be used to obtain a user identifier of the user for determining the set of bookmarks that are allowed to him/her.

In 608, the set of bookmarks is determined and may be activated as described for example for a single bookmark in FIG. 4 and for interrelated bookmarks in FIG. 5, and the process ends.

Figure 7:
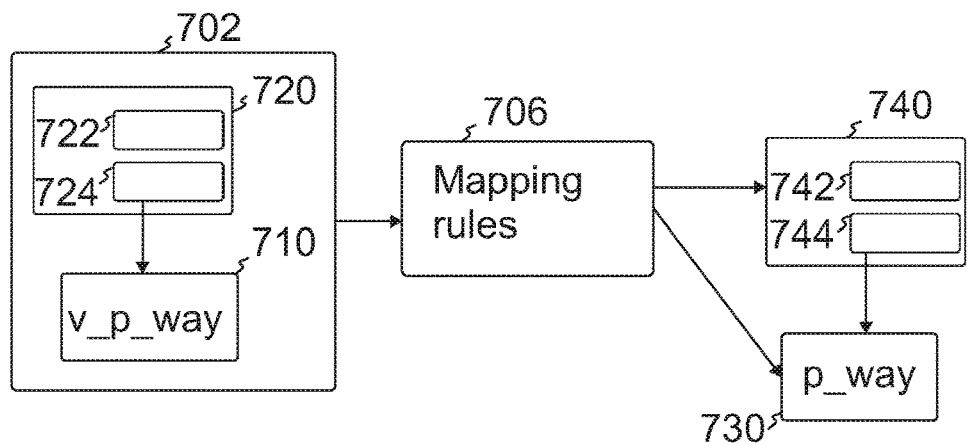
FIG. 7 illustrates updating information of activated bookmarks in a virtual environment to bookmarks of a physical structure defined to a geographical location.

FIG. 7 illustrates updating information of activated bookmarks 720 in a virtual environment 702 to bookmarks 740 of a physical structure defined to a geographical location. The updating is illustrated by functional blocks that may be implemented by an apparatus according to an embodiment. The bookmarks of the physical structure may be located in a structure described in FIG. 1. Various embodiments described herein apply to both bookmarks located in virtual environments and to bookmarks located in physical structures. Accordingly, bookmarks in the virtual environment may be activated similar to the bookmarks of the physical environment. The updating comprises an exchange of information between the virtual environment and one or more bookmarks of the physical structure. The exchanged information may comprise information identifying a bookmark, a function 724, 744 of the bookmark, a location 722, 742 of the bookmark, criterion of the bookmark and/or a passageway the bookmark operates, when the bookmarks is activated. The exchanged information provides an activation of a bookmark in the virtual environment to be reflected to the one or more bookmarks of the physical structure. The updating may also be performed such that an activation of a bookmark in the physical structure is reflected to the virtual environment.

The physical structure may have a virtual representation in the virtual environment. The virtual environment may be defined by a software application executed on a computer. The computer may operate as a server such that the virtual environment may be accessed from computer or mobile phones that are remote from the server. The remote access may be provided by an Internet connection.

The virtual environment that is executed may include a user interface component for displaying the virtual environment to a user. It may be also possible to receive commands via the user interface component for the purpose of defining one or more bookmarks to the virtual environment, e.g. according to the process of FIG. 3. The user interface component may be a software code portion of the software application that defines the virtual environment. The user interface component may be loaded into a user device e.g. mobile phone for displaying a view of the virtual environment to the user via a user interface, e.g. a display. One example of the virtual environment is a game executed on a computing device.

The user interface may be a typical user interface of a computing device that may be controlled to view the virtual environment by the software application. The user interface may be provided by one or more a touch screen, display, buttons and/or a keyboard, for example.

In an embodiment the representation of the physical structure in the virtual environment may include passageways 710 and bookmarks 720 that correspond to the passageways 730 and bookmarks 740 of the physical structure.

In the following, an embodiment including a process for updating information of activated bookmarks in the virtual environment to the bookmarks of the physical structure is described. The process comprises determining a function 724 executed in the virtual environment, determining the passageway 730 of the physical structure that corresponds to the passageway 710 operated on by the function 724 of the bookmark 720 activated in the virtual environment 702, and activating one or more bookmarks 740 of determined the physical structure said activated bookmarks operating on the determined passageway 730.

In the virtual environment, the function of the bookmarks operates on the passageway 710 included in the virtual environment. In the virtual environment, the passageway may be referred to as a virtual passageway. On the other hand in the physical structure the function 744 of the bookmark 740 operates on the passageway 710 located in the physical structure. The passageways and the functions of the virtual environment and the physical structure may be identified by the bookmarks of the virtual environment and the physical structure for determining which function is executed and which passageway the function operates on. The relationship between the passageways in the virtual environment and in the physical structure may be defined by mapping rules. The mapping rules may define one or more bookmarks of the virtual environment that correspond to the one or more bookmarks of the physical structure, whereby correspondence between a passageway of the virtual environment which is operated by a function maybe established to a passageway in the physical structure.

In an embodiment a function executed in the virtual environment indicates a performance level achieved in a software application being executed to realize the virtual environment. The performance level may be mapped by mapping rules to a function operating on the determined passageway of the physical structure. The performance level may be obtained din the virtual environment in response to activation of a bookmark in the virtual environment and execution of the function. The execution of the function changes the operational state of the virtual passageway in the virtual environment. The new operational state on the virtual environment may be used as the performance level. The operational state may be mapped to a performance level according to specific rules. Preferably the performance level represents an improvement in the operational state of the virtual passageway. The improvement may be an increase of a landing zone number in an elevator in the virtual environment, switch lights on/off in the virtual passageway, increasing or decreasing temperature of in the virtual environment, traveled distance in the virtual environment, reaching a location within the virtual environment.

In an embodiment, mapping rules define a mapping of the performance level in the virtual environment to a set of allowed functions of the passageway of the physical structure. In one example, the set of allowed operational states includes a set of allowed landing zones of an elevator.

In an embodiment the virtual environment may include an avatar of a user moving in the virtual environment. The avatar is the graphical representation of the user or the user's alter ego or character. The movement of the avatar in the virtual environment may be used to activate a bookmark similar to the movement of the user within the structure as described in various embodiments herein.

Various embodiments described above including bookmarks in a virtual environment and in a physical structure provide activation of the bookmarks by updating information of activated bookmarks in the virtual environment to the bookmarks of the physical structure.

Figure 8:
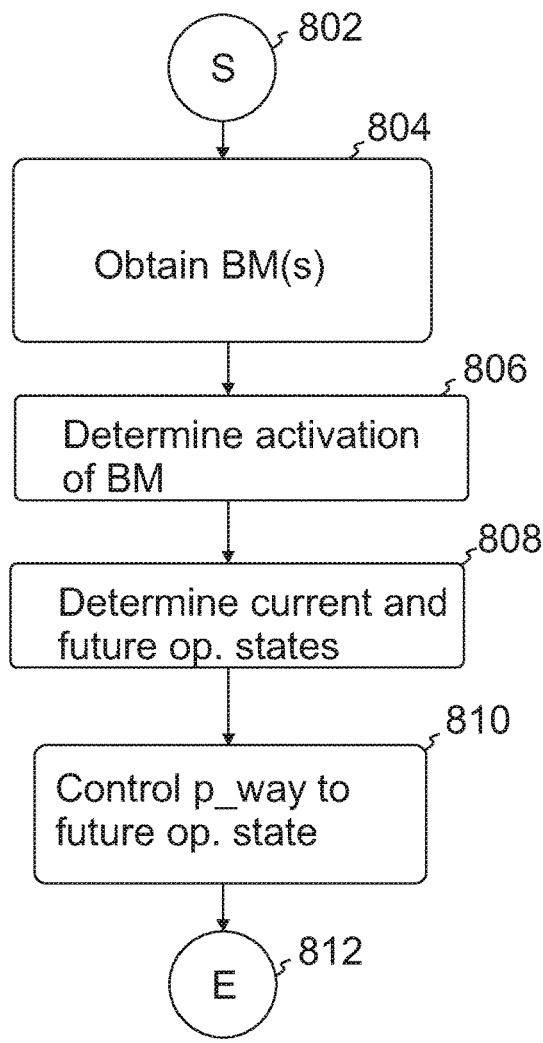
FIG. 8 illustrates controlling a passageway towards its future operational state.

FIG. 8 illustrates controlling a passageway towards its future operational state. The operational state of the passageway may be controlled changed by activation of a bookmark as described in FIG. 2. The passageway and the bookmark may be arranged to a structure as described in FIG. 1. The controlling is illustrated by a process according to an embodiment. The process may start 802, when a bookmark has been defined in a structure and the bookmark includes a function that operates a passageway in the structure between at least two operational states.

In 804 one or more bookmarks are obtained. A bookmark includes at least a location of the bookmark within the structure, and a function for operating the passageway, when the bookmark is activated. Step 604 in FIG. 6 describes obtaining a bookmark that may be applied in this step.

In 806 an activation of a bookmark is determined. The activation of the bookmarks may be determined as described above with FIG. 4 for a single bookmark and for interrelated bookmarks in FIG. 5.

In 808 a current operational state of the passageway is determined. The current operational state may be retrieved from a memory or obtained by a query a transportation system of the passageway. Also a future operational state of the passageway is determined on the basis of the function of the activated bookmark. The execution of the function may result in the future operational state of the passageway as described in FIG. 2.

In 810 the passageway is controlled towards the determined future operational state, when the current operational state and the future operational state are different. In the event the new operational state of the passageway is the same as the current operational state, the controlling step may be omitted or considered as completed.

The method described in FIG. 8 may be preferably executed by a transportation system of the passageway, for example an elevator control system. In an elevator control system the operational states may correspond to landing zones of the elevator and the described method may determine a future landing zone of the elevator. After the future landing zone of the elevator is determined, the elevator control system may control the elevator in a conventional manner towards the determined future landing zone. The controlling may include driving a hoisting machinery of the elevator, for example.

In 812 the method may end after the controlling for the passageway to reach the future operational state has been performed.

Figure 9:
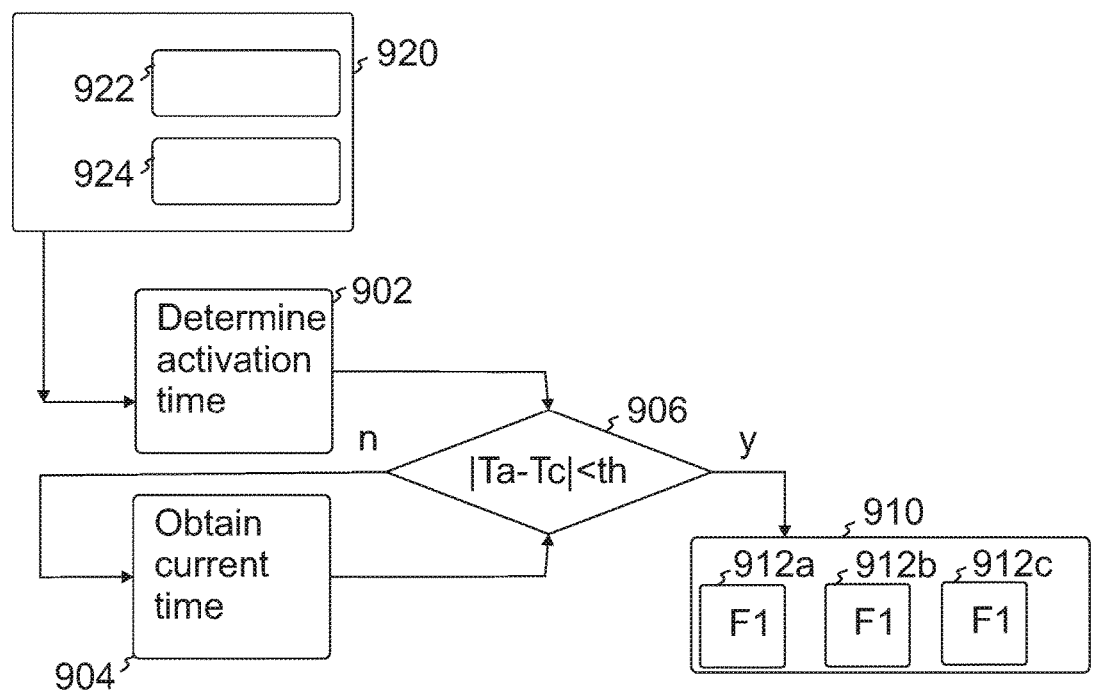
FIG. 9 illustrates queuing functions for operating on a passageway according to an embodiment.

FIG. 9 illustrates queuing functions 912a-912c for operating on a passageway according to an embodiment. The queuing is illustrated by functional blocks that may be implemented by an apparatus according to an embodiment. The functions are queued for execution 910 by activation of the bookmark 920. A bookmark may be activated as described with FIG. 4 for a single bookmark and for interrelated bookmarks in FIG. 5. Execution of the functions operates the passageway as described in FIG. 2.

The process may start by activation of the bookmark that includes a function 924 for operating the passageway and a location 922 within a structure, for examples as described in FIG. 1.

In 902 an activation time $T_a$ of the bookmark is determined. In 904 the current time $T_c$, is determined. If the activation time $T_a$ is substantially the current time $T_c$, the function may be directly queued for execution and the process proceeds to operate the passageway 910 by the functions that are queued for execution. The functions to be executed may be referred to be in a pipeline for processing by a service logic applied to the passageway. The service logic defines how traffic is served through the passageway. The service logic may be for example by a transportation system of the passageway. In the direct queuing, the function is executed 910 from the queue using the service logic of the passageway. In elevators, this service logic may control the elevator between elevator landing zones using a variety of parameters including but not limited to the number of people aboard the elevator and elevator calls from landing zones. In one example the queued function is an elevator call to a landing zone and the elevator call is served using the service logic.

If the activation time is far removed from the current time, for example in the future, the process proceeds to monitor the activation against the current time. The activation time and the current time may be monitored e.g. by a comparison against a threshold values for their difference $|T_a-T_c|<th$, where th is used as a threshold and it is the absolute value for the difference between the activation time and the current time. In this way the function of the activated bookmark may be performed substantially at a defined time, $T_a$. The th may be set according to the current queue length. The queue length may be determined on the basis of the functions in the queue. Preferably, the threshold th is set such that the function is queued for execution before the desired activation time. In this way the actual activation of the bookmark and execution of the function may be achieved substantially at the defined activation time.

The activation time may be defined as a criterion, when the bookmark is defined. Defining the activation time as criteria provides timing bookmarks in advance for executing the functions of the bookmarks at a specific time in the future. This allows passageways to be operated based on the prescheduled needs of people to use the passageway. In one example an activation time allows pre-ordering of an elevator to a landing zone. Once the activation time meets the condition set in 906, the elevator call may be received by an elevator control system.

The process of FIG. 9 may be performed for a plurality of bookmarks in parallel or at least partly in parallel. In one example, after a bookmark has been defined and the bookmark includes an activation time, the bookmark is monitored for the activation time approaching the current time.

Figure 10:
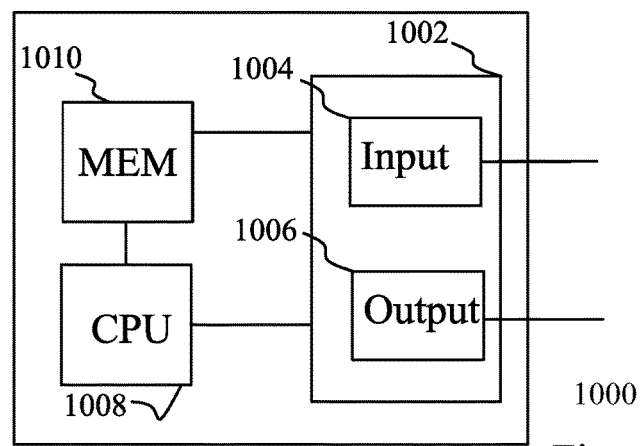
FIG. 10 is a block diagram of an apparatus according to an embodiment.

FIG. 10 illustrates an apparatus 1000 for carrying out an embodiment. The apparatus may be used to implement the functionalities described in the embodiments described herein. FIG. 10 is a block diagram of the apparatus 1000. Although the apparatus has been depicted as one entity, different modules and memory may be implemented in one or more physical or logical entities. The apparatus may be a subscriber terminal, a mobile phone, a computer, a server computer or an elevator control system, for example. Different functions may be performed by different blocks of the apparatus and/or execution of the functions may be shared between parts or between all of the blocks.

The apparatus 1000 comprises an interfacing unit 1002, a processing unit 1008, and a memory (M) 1010, that are all being electrically interconnected. The processing unit may comprise a single-core or a multi-core processor. The interfacing unit comprises an input 1004 and an output unit 1006 that provide, respectively, the input and output interfaces to the apparatus. The input and output units may be configured or arranged to send and receive data packets and/or transmissions according to one or more protocols according to communications standards and/or proprietary communications systems including but not limited to: ISA, PCI, Ethernet, and IEEE 802.11 based Wireless Local Area Network and various cellular communications technologies and any other suitable standard/non-standard communication means. The memory may comprise one or more applications that are executable by the handover unit.

The processing unit may be implemented by a central processing unit (CPU) capable of performing further tasks in addition to the tasks for executing the handover. The CPU may comprise a set of registers, an arithmetic logic unit, and a control unit. The handover unit may have dedicated parts of the CPU for performing the handover tasks. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example.

The techniques described herein may be implemented by various means so that an apparatus implementing one or more functions described with an embodiment comprises not only prior art means, but also means for receiving indoor positioning information for positioning a user within a structure including at least one passageway and one or more bookmarks, a bookmark including a location of the bookmark within the structure, and a function for operating the passageway, when the bookmark is activated, determining a location of the user, comparing the location of the user with the locations of the bookmarks, determining at least one bookmark to be activated on the basis of the correspondence of the user's location and the locations of the bookmarks, activating the determined bookmark.

According to another aspect, an apparatus implementing one or more functions described with an embodiment comprises not only prior art means, but also means for operating a passageway within a structure, obtaining one or more bookmarks, a bookmark including a location of the bookmark within the structure, and a function for operating the passageway, when the bookmark is activated, determining an activation of a bookmark, determining a current operational state of the passageway, determining a future operational state of the passageway on the basis of the function of the activated bookmark, controlling the passageway towards the future operational state, when the current operational state and the future operational state are different.

According to an embodiment, there is provided an arrangement comprising a positioning unit for obtaining indoor positioning information for positioning a user within a structure including at least one passageway and one or more bookmarks, a bookmark including a location of the bookmark within the structure, and a function for operating the passageway, when the bookmark is activated; and a control unit operatively connected to the receiver and the positioning unit and configured to execute one or more functionalities described with an embodiment.

According to an embodiment, there is provided an arrangement comprising a control unit for operating a passageway within a structure, a receiver for obtaining one or more bookmarks, a bookmark including a location of the bookmark within the structure, and a function for operating the passageway, when the bookmark is activated, the control unit and the receiver are operatively connected to cause the control unit to execute one or more functionalities described with an embodiment. FIG. 10 illustrates a block diagram suitable for implementing the arrangement of parts of the arrangement.

More precisely, the various means comprise means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:
1. A method comprising the steps of:
  receiving indoor positioning information for positioning a user within a structure, the structure including at least one passageway and one or more physical bookmarks, at least one of the one or more physical bookmarks installed to the structure for operating the at least one passageway, said at least one physical bookmark including a location of the at least one physical bookmark within the structure, one or more functions, and one or more criterion relating to activation of the at least one physical bookmark, one of said one or more functions being for operating the passageway, when the at least one physical bookmark is activated;
determining a location of the user;
comparing the location of the user with the locations of the at least one physical bookmark;
determining at least one physical bookmark to be activated on the basis of the correspondence of the user's location and the locations of the at least one physical bookmark;
activating the determined at least one physical bookmark;
executing the function of the determined at least one physical bookmark, in response to the determined at least one physical bookmark being activated;
updating a corresponding virtual bookmark in a virtual representation of the structure in a virtual environment, said virtual environment being configured viewable on a user interface of a computing device by a software application, the virtual representation of the structure including at least one virtual passageway and one or more virtual bookmarks that correspond to the at least one passageway and the one or more physical bookmarks of the structure, respectively, the step of updating comprising:
selecting a virtual bookmark in the virtual representation of the structure corresponding to the determined at least one physical bookmark;
updating the virtual bookmark by exchanging information with the determined at least one physical bookmark, the information comprising: one or more functions for the selected virtual bookmark, and one or more criterion relating to activation of the selected virtual bookmark; and
updating the virtual bookmark such that the activation of the determined at least one physical bookmark is reflected to the corresponding virtual bookmark.

2. The method according to claim 1, wherein the at least one physical bookmark includes a plurality of physical bookmarks,
wherein the plurality of physical bookmarks are interrelated by their locations and/or functions, and
wherein the method further comprises the steps of:
determining a first physical bookmark of the plurality of physical bookmarks to be activated;
determining one or more interrelated physical bookmarks of the activated physical bookmark; and
activating the determined interrelated physical bookmarks.

3. The method according to claim 1, wherein one of the at least one physical bookmark includes a plurality of functions selectable via a user interface by a user, and
wherein the method further comprises the steps of:
receiving user input via the user interface; and
defining the one physical bookmark to include the location of the user or a location defined by the user via the user interface.

4. The method according to claim 3, further comprising the steps of:
receiving user input via the user interface;
defining the one physical bookmark to include one or more activation criteria defined by the user via the user interface; and
activating the one physical bookmark, when the defined criteria are met.

5. The method according to claim 1, wherein one of the at least one physical bookmark includes one or more user identifiers of allowed users to activate the one physical bookmark, and
wherein the method further comprises the steps of:
obtaining information identifying the one physical bookmarks within the structure; and
determining, on the basis of the received information, a set of physical bookmarks from the obtained physical bookmarks that are allowed for the user.

6. The method according to claim 5, wherein the allowed physical bookmarks include one or more further activation criteria, and the physical bookmark is activated, when a defined criteria are met.

7. The method according to claim 1, further comprising the steps of:
determining a function executed in the virtual environment;
determining the passageway of the physical structure that corresponds to the passageway operated on by the function of the virtual bookmark activated in the virtual environment; and
activating one or more physical bookmarks of determined the physical structure said activated virtual bookmarks operating on the determined passageway.

8. The method according to claim 7, wherein the function executed in the virtual environment indicates a performance level achieved in the executed software application and the performance level is mapped by mapping rules to a function operating on the determined passageway of the physical structure.

9. The method according to claim 8, wherein the mapping rules define a mapping of the performance level to a set of allowed operational states of the determined passageway of the physical structure, said set of allowed functions including a set of allowed landing zones of an elevator.

10. The method according to claim 1, wherein the activation criteria comprising one or more from a location within the structure, an activation time, a time period of activity, a user identifier of allowed users of the bookmark, and a number of activation times.

11. The method according to claim 1, wherein the passageway is a hoistway of an elevator, the hoistway including an elevator car operated between landing zones of the elevator.

12. An arrangement comprising:
a processor configured to obtain indoor positioning information for positioning a user within a structure including at least one passageway and one or more bookmarks, a bookmark including a location of the bookmark within the structure, and a function for operating the passageway, when the bookmark is activated; and
execute the steps of claim 1.

13. The arrangement according to claim 12, wherein the arrangement is a mobile phone or a computer.

14. A computer program product embodied on a non-transitory computer readable medium and comprising executable code that when executed, cause execution of functions the method according to claim 1.

15. The method according to claim 1, wherein each bookmark is definable by the user selecting one or more functions relating to the operational states of the passageway, and one or more criterion relating to activation of the bookmark.

* * * * *